US008266473B2

(12) United States Patent
Casale et al.

(10) Patent No.: US 8,266,473 B2
(45) Date of Patent: Sep. 11, 2012

(54) DISASTER RECOVERY ARCHITECTURE (75) Inventors: Luca Casale, Venaria (IT); Filippo Farina, Turin (IT); Eugenio Maria Maffione, Turin (IT)

(73) Assignee: Telecom Italia S.p.A., Milan (IT)

( * ) Notice: Subject to any disclaimer, the term of this patent is extended or adjusted under 35 U.S.C. 154(b) by 215 days.

(21) Appl. No.: 11/885,999

(22) PCT Filed: Mar. 10, 2005

(86) PCT No.: PCT/EP2005/002535
§ 371 (c)(1),
(2), (4) Date: Apr. 22, 2008

(87) PCT Pub. No.: WO2006/094527
PCT Pub. Date: Sep. 14, 2006

(65) Prior Publication Data
US 2008/0209258 A1 Aug. 28, 2008

(51) Int. Cl.
*G06F 11/00* (2006.01)
(52) U.S. Cl. .............................. 714/4.11; 714/15; 714/19
(58) Field of Classification Search .................. 714/4, 5, 714/15, 19, 4.1, 4.11
See application file for complete search history.

(56) References Cited

U.S. PATENT DOCUMENTS

| | | | | |
|---|---|---|---|---|
| 5,513,314 A * | 4/1996 | Kandasamy et al. | ............. | 714/6 |
| 5,630,047 A * | 5/1997 | Wang | ............................... | 714/15 |
| 5,923,850 A * | 7/1999 | Barroux | ........................ | 709/224 |
| 6,185,601 B1 | 2/2001 | Wolff | | |
| 6,292,905 B1 * | 9/2001 | Wallach et al. | .................... | 714/4 |
| 6,694,447 B1 * | 2/2004 | Leach et al. | ....................... | 714/6 |
| 6,862,263 B1 | 3/2005 | Simmons | | |
| 7,065,767 B2 * | 6/2006 | Kambhammettu et al. | .. | 719/310 |
| 7,231,544 B2 * | 6/2007 | Tan et al. | ......................... | 714/15 |
| 7,383,463 B2 * | 6/2008 | Hayden et al. | ..................... | 714/4 |
| 7,483,926 B2 * | 1/2009 | Chandhok et al. | ..................... | 1/1 |
| 2001/0037473 A1 | 11/2001 | Matsuura et al. | | |
| 2004/0078397 A1 | 4/2004 | Mehta et al. | | |
| 2004/0153698 A1 | 8/2004 | Guzman et al. | | |

FOREIGN PATENT DOCUMENTS

| | | |
|---|---|---|
| JP | 08-235132 A | 9/1996 |
| JP | 10-105423 A | 4/1998 |
| JP | 2001-306349 A | 11/2001 |
| JP | 2003-196172 A | 7/2003 |

OTHER PUBLICATIONS

Keeton et al.; "A Framework for Evaluating Storage System Dependability", Proceedings of the 2004 International Conference of Dependable Systems and Networks (DSN'04), 10 pages, (2004).
Lyu; "An Integrated Approach to Achieving High Software Reliability", Aerospace Conference, 1998 IEEE Snowmass at Aspen, Co., IEEE, vol. 4, pp. 123-136, (1998).

(Continued)

*Primary Examiner* — Philip Guyton
(74) *Attorney, Agent, or Firm* — Finnegan, Henderson, Farabow, Garrett & Dunner, L.L.P.

(57) ABSTRACT

A method and system for disaster recovery in a packet-based network. The network includes a production site and a recovery site coupled together by the packet-based network. Mirroring software on the production site keeps a recovery site up to date to the last transaction occurring on the production site. A recovery control server polls the production site in order to detect a disaster condition or other failure. Upon detection of a problem at the production site, the recovery control server reconfigures the network so those attempts to access the production site are routed to the recovery site.

13 Claims, 8 Drawing Sheets

OTHER PUBLICATIONS

"Cisco Systems, Cisco Network Boot Installation and Configuration Guide", Release, 2.1., Chapters 1-4, pp. i-xii , 1-1-4-12, and GL-1 - GL-4 and IN-1-IN-6,. http://www.cisco.com/en/US/products/hw/ps4159/ps2160/products_installation_and_configuration_guide_book09186a00801a45b0.html, (2002).

White Paper VERITAS Bare Metal Restore, Automated System Recovery With Veritas Netbackup, pp. 1-9, (2002), http://www.veritas.com/Products/www?c=product&refld=140.

Translation of Japanese Office Action issued in corresponding application No. JP 2011-281959 on Mar. 19, 2012, 4 pages.

* cited by examiner

DISASTER RECOVERY ARCHITECTURE

CROSS REFERENCE TO RELATED APPLICATION

This application is a national phase application based on PCT/EP2005/002535, filed Mar. 10, 2005, the content of which is incorporated herein by reference.

TECHNICAL FIELD OF THE INVENTION

The present invention relates generally to telecommunication networks, and, more particularly, to disaster recovery techniques used in telecommunication networks.

BACKGROUND ART

With the popularity and convenience of networking computer systems, data sharing among users through databases has become common in many business environments. Providing central access to information via databases requires careful consideration of database maintenance and management. Further, recovery techniques are essential in ensuring database coherence following a hardware/device failure or application logic failure.

In general, recovery techniques reset a system or data stored in a system to an operable state following damage and provide a process of rebuilding databases by restoring a backup copy.

In any data recovery system there are two points of interest:
First, the Recovery Point Objective (RPO), which defines the maximum planned variance between the original data and the backup copy.
Second, the Recovery Time Objective (RTO), which defines the maximum time for the re-establishment of service.

One of the most simplistic forms of system backup includes physically transporting copies of data made on magnetic tapes to a remote archiving site. Generally, this requires a user to halt all database activity while making the backup tape. The disaster recovery process then involves using the backup tape to recover the databases.

A more modern form of system backup uses a network interconnection to perform periodic backups of a production site. The times when such backups occur is controlled by a network administrator. The method for restoring the application server includes installing a new system starting with hardware that has similar characteristics to the old system and restoring the backed up image of the system from the recovery site.

Another prior art system supplied by Veritas (available on the Internet for download via the URL: http://www.veritas.com/Products/www?c=product&refId=140 at the filing date of the present patent application) contemplates an architecture of software modules for controlling the various phases necessary for the correct execution of the backup procedure and the subsequent phase of restoring clients. In particular, the Veritas solution uses different servers for each separate functional aspect including a server for the control and management of backup operations, a server for the control of the client restore phase, a server that provides the clients with the programs and configurations necessary for the restore, and, finally, a server for the management of remote booting.

Another prior art solution is a Cisco Network Boot System described in a paper entitled "Cisco Network Boot Installation and Configuration Guide, Release 3.1", available on the Internet for download via the URL: http://www.cisco.com/en/US/products/hw/ps4159/ps2160/products_installation_and_configuration_guide_book09186a00801a45b0.html (at the filing date of the present patent application) that makes copies of the entire system image including the operating system, the applications on the server and the data. The backup is performed manually by a network administrator. The Cisco solution provides the possibility of remotely executing a boot procedure over a network, provided that it has hardware characteristics identical to the primary server from which the replication was made. The recovery server is therefore able to restore a remote copy of the system image from across the network and re-offer the services previously assured by the primary server.

In US Patent publication US2004/0153698 A1, there is provided a system and method of disaster preparedness and restoration of service of damaged or destroyed telecommunication network elements. A computer-implemented method of disaster backup for network elements includes establishing connectivity to a plurality of network elements. A host computer may transmit one or more commands to the network elements for invoking a computer routine to create a plurality of computer readable service continuity data to a local memory of the network elements. An automated system of computer executable components for disaster recovery of network elements includes a computer executable controller component that is configured to select a plurality of network elements designated for disaster backup action. A computer executable engine component is configured to establish connectivity to the plurality of network elements and to transmit one or more commands to the network elements so as to replicate service continuity data for each of said network elements.

In US Patent publication US 2004/0078397 A1 a file system disaster recovery techniques provides automated monitoring, failure detection and multi-step failover from a primary designated target to one of a designated group of secondary designated targets. Secondary designated targets may be prioritized so that failover occurs in a prescribed sequence. Replication of information between the primary designated target and the secondary designated targets allows failover in a manner that maximizes continuity of operation. In addition, user-specified actions may be initiated on failure detection and/or on failover operations and/or on failback operations.

OBJECT AND SUMMARY OF THE INVENTION

Applicant has observed that in restoring a system after a disaster event a problem exists to guarantee that a service may be reached by clients independently of restoring of the network element and without the clients having to change manually their configurations to reach a recovery server on a recovery site, preferably while maintaining good RPO and RTO values.

The Applicant has found that this problem can be solved by means of a method of performing disaster recovery in an architecture including a production site (52) and a recovery site (54) adapted for being coupled together by a packet-based network (56), characterized by comprising:
  detecting a problem with the production site (52); and
  in response to the detection of the problem, automatically reconfiguring the packet-based network (56) so that attempts to access the production site (52) via the packet-based network (56) are routed to the recover site (54).

In particular, the Applicant has found that this problem may be solved by providing automatic rerouting mechanisms that route clients to the recovery server. Further, this problem may be solved by providing automated control and management mechanisms for the data replication phase via mirroring procedures that enable the data and the configuration of the server to be always aligned with the last transaction.

Another aspect of the present invention relates to a system (50) for performing disaster recovery in a packet-based telecommunication network (56), said system including a production site (52) and a recovery site (54) adapted for being coupled together by the network (56), characterized by comprising:

a recovery control server (84) located on the recovery site (54) including:

a first module (154) capable of detecting a problem with the production site (52); and a second module (160) capable of automatically reconfiguring the network upon detection of the problem so that attempts to access the production site (52) are routed to the recovery site (54).

Further aspects of the present invention relate to a computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

Further preferred aspects of the present invention are described in the dependent claims and in the following description.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

Figure 1:
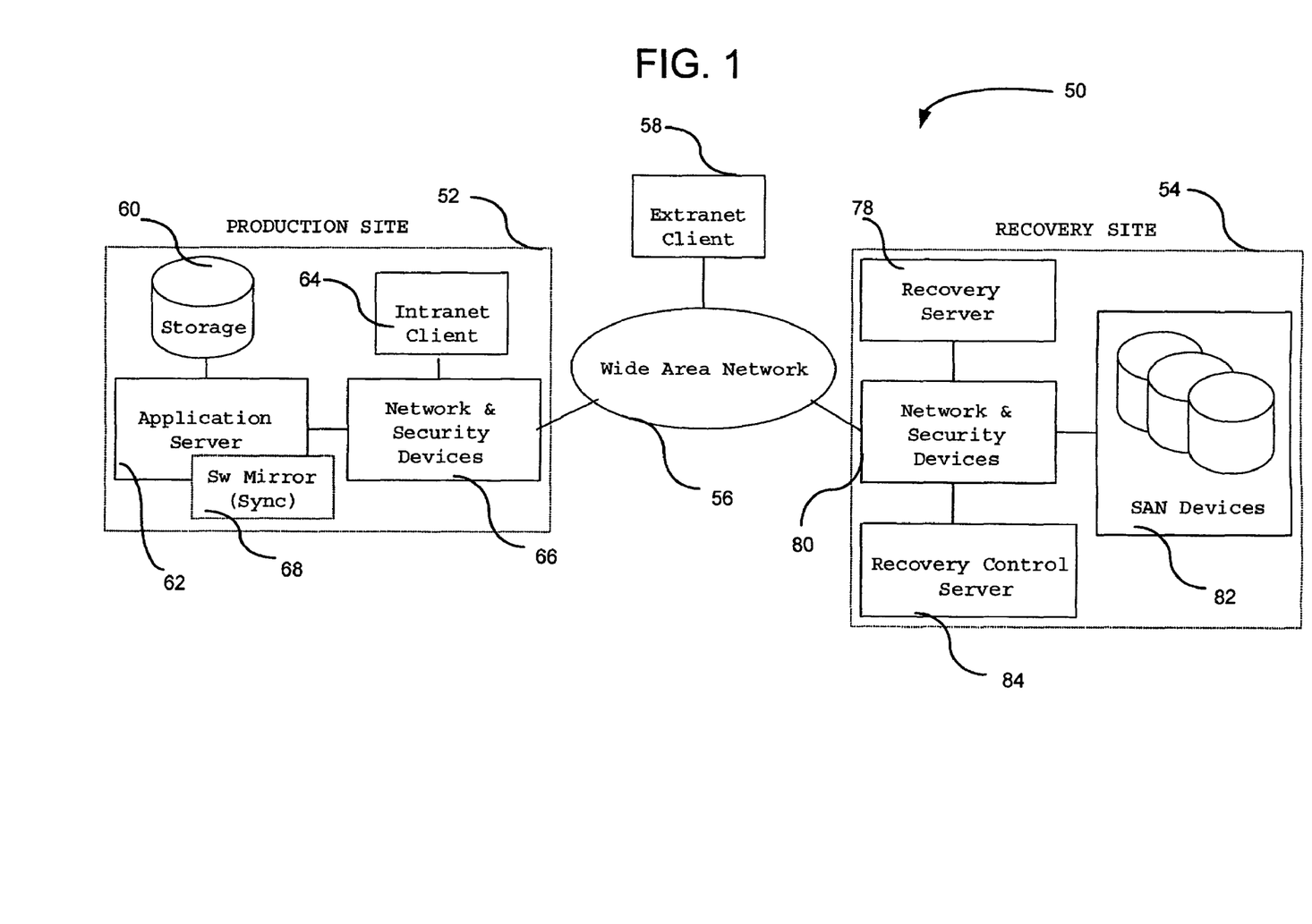
FIG. 1 is a system diagram for performing disaster recovery according to the invention.

FIG. 1 is a diagram of a system 50 including a production site 52, a recovery site 54, a network 56 coupled between the production site and the recovery site, and an extranet client 58. The production site can include storage 60 coupled to one or more application servers 62. One or more intranet clients 64 are used to access the application servers 62 via a network 66, which may include for example Ethernet switches and IP routers. Also shown in box 66 are security devices that may include authentication systems, firewalls or intrusion detection systems that block access to the application servers. A mirroring software module 68 is used to carry out a synchronous replication of the local image of the application server on remote storage volumes. Such synchronous replication ensures that the data deposited on storage 60 is aligned, up to the last transaction, with a copy held on the recovery site 54. It is also desirable that the mirroring software module saves an image of the system that corresponds to a stable operating condition of the system so that in cases where the latest transactions have caused damage to the server's configuration, it is possible to return to the previously saved stable image.

The recovery site 54 can include one or more recovery servers 78, network and security devices 80, storage area network (SAN) devices 82, and a recovery control server 84. The recovery server 78 is designed to mimic the application server 62 in case of disaster. It may be desirable to provide a pool of recovery servers with varying hardware characteristics so that one of the pool most closely associated to the application server 62 can be used in case of disaster. The SAN devices 82 store the mirrored data provided from mirroring software module 68. The network and security devices 80 perform the same functions for the recovery site 54 as the network and security devices 66 on the production site. The recovery control server 84 performs periodic requests (keep-alive) to each application server 62 that is managed to monitor their accessibility. In this way, the recovery control server 84 can monitor whether there is a problem at the production site 52. Additionally, the recovery control server 84 may monitor the storage flow from the one or more application servers 62 to the SAN storage units 82 at the recovery site 54 via the mirroring software 68. Many techniques can be used to monitor the production site 52 from the recovery control server 84, such as for example by polling. As further described below, the recovery control server 84 also controls the automatic switching from the production site 52 to the recovery site 54 in the case where a problem is detected on the production site. In so doing, it may be necessary to choose one of the recovery servers 78 from the pool of available servers that is most closely associated with the application server 62 on which the problem is detected. Additionally, the recovery control server 84 automatically reconfigures the necessary networks 56, 66 to allow the extranet clients 58 and intranet clients 64 access the recovery servers 78 automatically and seamlessly. Finally, the recovery control server 84 can automatically manage a fail-back condition where the application server 62 is restored and the data from SAN devices 82 needs to be copied back to the production site 52.

Figure 2:
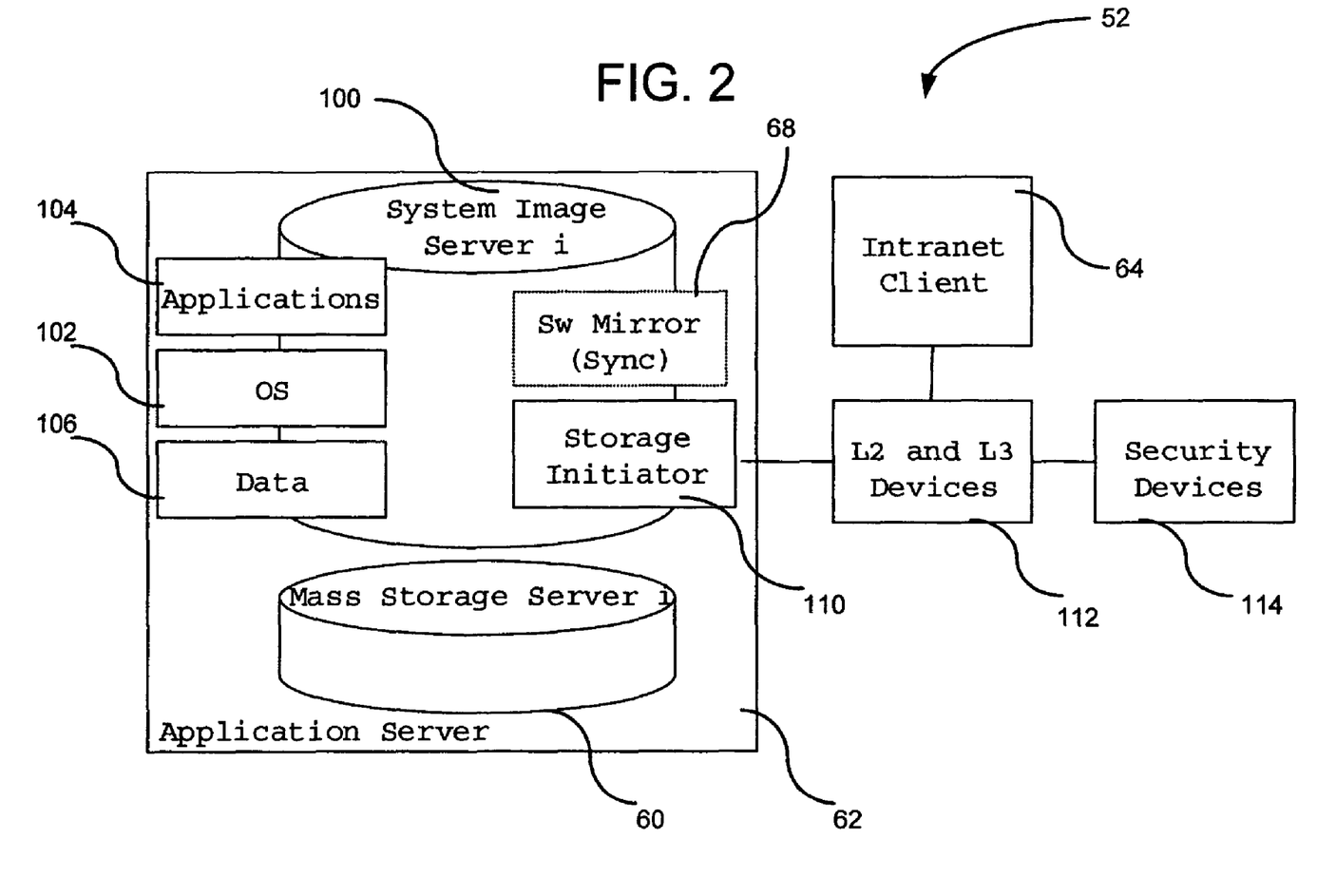
FIG. 2 is detailed system diagram of the production site of FIG. 1.

FIG. 2 shows a further detailed example of a potential production site 52. The application server 62 includes a system image 100. The system image 100 includes an operating system 102, a set of applications 104, and data 106 upon which the operating system and applications operate. Mass storage 60 includes the local storage devices where the data 106 is saved. A storage initiator 110 is also present on the application server 62 and is a software module that allows data to be transferred to remote storage volumes accessible via a network infrastructure (e.g., LAN, WAN, etc.). The software mirror 68 is the software module that carries out the synchronous replication of the local image in the application server 62. The local image is then stored on the recovery site 54 via the storage initiator module 110. The software mirror module 68 may also take snapshots of the system image so as to keep multiple system images at different time intervals. Thus, in addition to having the last transaction, it is possible to have stable copies of the system at different time intervals. This allows the system to be have one or more stable copies acquired at different times, allowing the system to return to a previously known stable state. Using the software mirror 68, a remote copy of the system image is accomplished, which frees the architecture from proprietary solutions belonging to a specific manufacturer. A software mirror module of the type above-mentioned is for example available on the Internet for download via the URL: http://www.veritas.com/Products/www?c=product&refId=3 (at the filing date of the present patent application).

The intranet client 64 can access the application server 62 via network devices 112, which in this case are shown as level 2 and level 3 devices. Thus, the network devices 112 are the devices used for the packet-based network of the production site and allow connection to a third-party packet-based network for access at the metropolitan, national, or international levels. The network devices 112 can be LAN/MAN technologies, IP routers, etc. Security devices 114 provide security with regard to unauthorized access from extranet clients. For example, the security devices could include firewalls, intrusion detection systems, etc. The security devices can be monitored and configured via any desired standard (e.g., SNMP) or via a command-line interface.

Figure 3:
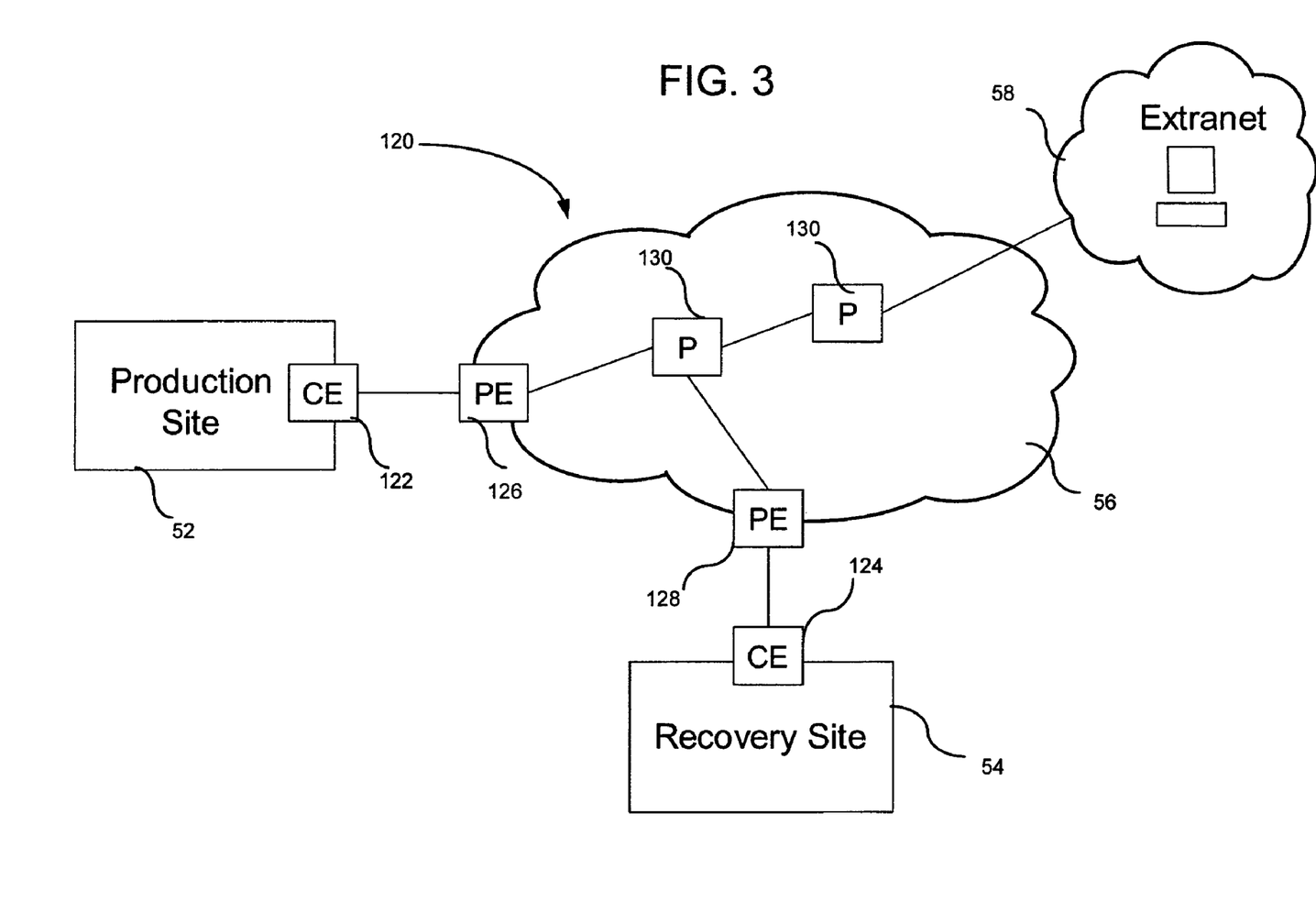
FIG. 3 is a detailed diagram of a wide area network.

FIG. 3 shows the WAN 56 in more detail. The WAN 56 allows interconnection between the extranet 58, the production site 52, and the recovery site 54. A wide variety of protocols may be used. For example, the Multi-Protocol Label Switching (MPLS) protocol can be used to allow the use of the virtual private network (VPN) service for interconnecting two sites. The WAN 56 includes multiple network switching devices shown generally at 120. Specifically, customer edge devices (e.g., apparatus of a network, such as a router or a switch, used to connect the network to client computers) 122, 124 are located on the production site 52 and recovery site 54, respectively, and allow communication with provider edge (PE) network devices 126, 128, (e.g., routers that are part of the service provider's network that allow connection to the customer edge devices) situated at the point of presence (PoP) of the provider. Other provider network devices 130 (designated simply P) allow communication between the provider edges 126, 128 and the extranet 58. To add a new site to a pre-existing VPN, the provider can add, using a Provisioning Platform for example, the correct configurations on the CE and PE devices. A MPLS VPN allows IP-level connectivity to be provided to sites belonging to the same VPN. More innovative solutions, such as (Virtual Private LAN Services), allow Ethernet connectivity to be set up between sites belonging to the same VPN. As in the MPLS VPN solution, to add a new site to a VPLS, the provider only takes action on the CE and PE devices. The main difference between the two solutions is that, in the case of VPLS services, the provider does not manage the routing made by the customer.

As further described below, the recovery control server 84 of the recovery site has the ability to reroute the network devices 120 so that in case of disaster, the extranet 58 and intranet clients 64 can access the recovery site 54. The recovery control server 84 autonomously sets up the operating rules on the systems belonging to its operating domain (production site and recovery site) and when necessary can interact with systems outside its direct control by interfacing with other control systems, typically run by third parties, such as network operators.

Figure 4:
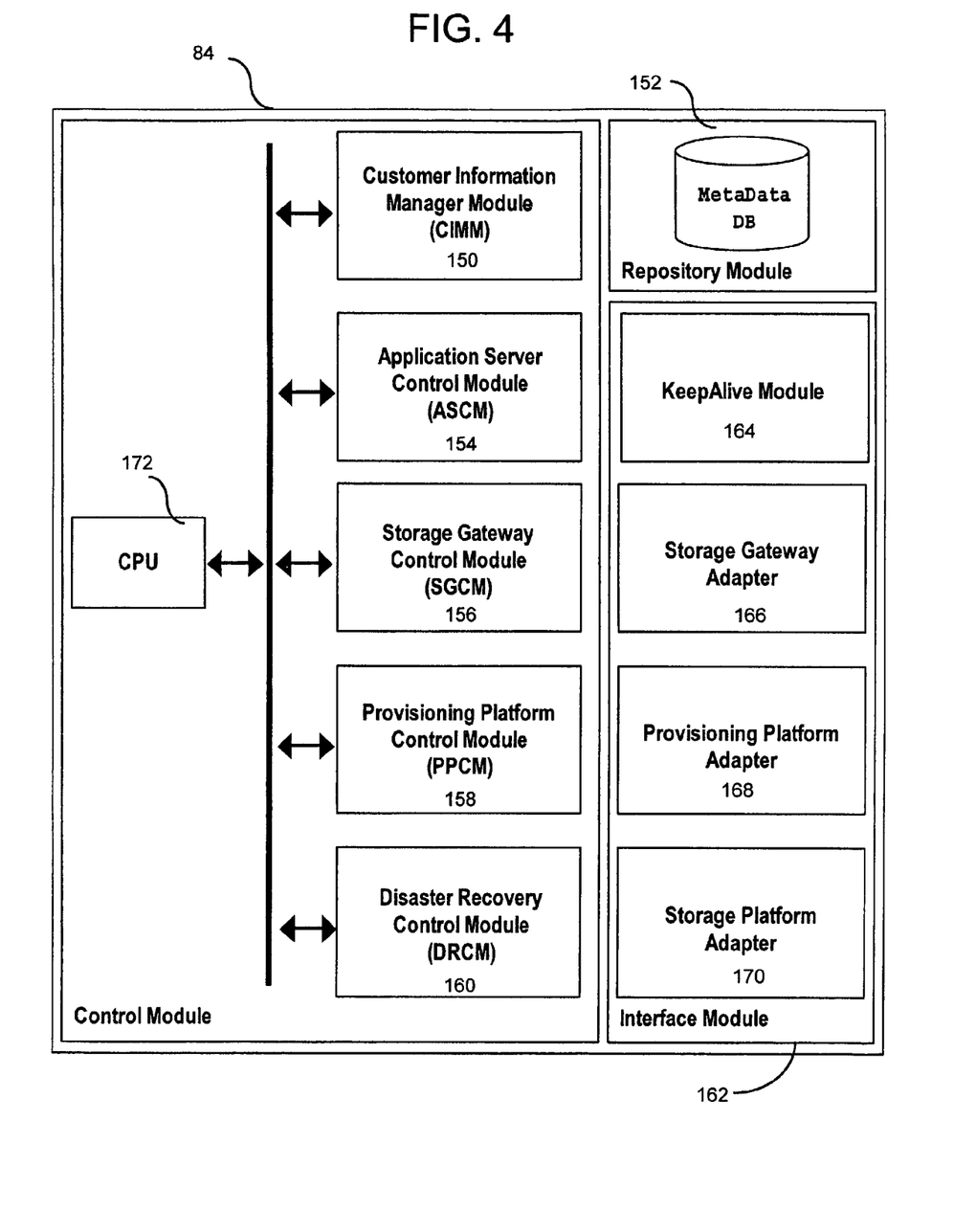
FIG. 4 is a detailed diagram of a recovery control server.

FIG. 4 shows further details of the recovery control server 84. For purposes of illustration, the description refers to the case in which the WAN is used in conjunction MPLS functionality, but other packet-based networks may be used that allow the configuration of private virtual network solutions as described above. A customer information manager module 150 (CIMM) is a software module that deals with managing the MetaData inside a repository module 152 and details the characteristics of the application server 62 at the production site 52. The information stored in the repository module 150 can include:

Application server routing plan.
Application server access rules for intranet/extranet clients.
Information on production site network topology and the interconnection between the Production Site and the recovery site.
Hardware characteristics of the application server
Image characteristics, in terms of operating system, installed software packages etc.
Service Level Agreements agreed for the Service.
Availability of server at the recovery site with characteristics compatible with the application server at the production site.

An application server control module (ASCM) 154 is the software module that checks the application server accessibility at the production site 52. This check is carried out by polling the server's IP address or by verifying that the application installed in the server 62 is active. An additional level of control is enabled via the software that enables the synchronous mirroring process between the local storage and the remote storage. If the application server 62 cannot be accessed for a period of time exceeding a configurable threshold (for example, 30 seconds, but this time can vary depending on the particular application) the ASCM module 154 will make a request for activation of the disaster recovery procedure.

A storage gateway control module (SGCM) 156 makes requests to the storage gateway management system and can implement the following functions:

Access by the application server 62 to storage devices at the recovery site 54. Storage access is managed through the configuration of Access Control Lists (ACL), which specify which servers have the permissions to access a given storage device.
Request to release or allocate resources. This function allows a request to release pre-allocated resources to be made, for example, because it has been decided to stop the disaster recovery service for a given application server or, conversely, to allocate new storage resources. This function updates the information regarding the SLAs undersigned by a customer and is held in the repository 152.
Management of the replication process in fail back conditions. After a disaster recovery procedure, this function allows a copy of the data used locally by the recovery server 78 at the recovery site 54 to be made on the storage volumes at the production site 52. After the data has been restored in a consistent manner at the production site, it is possible to return to the initial operating conditions, in which the service accessed by Intranet and Extranet clients is published by the application server at the production site.
Checking usage status of the allocated resources. By means of this function, it is possible to obtain statistics regarding the effective utilization of the storage devices and assess the acquisition of new devices (processing and storage resources for the Recovery Site pool) in advance.

A provisioning platform control module (PPCM) 158 is the software module that deals with requests to the provisioning platform. The vendors of network devices provide provisioning platforms that allow the translation of requests received in a programming meta-language into configurations to be added to the network devices. The PPCM 158 carries out these requests according to the topology of the network that interconnects the production site 52 and the recovery site 54. The provisioning systems automatically generate the configuration commands to be added to the devices, based on a topological description of the network infrastructure they handle and a description of the desired final state of the network. These requests can be made, for example, in the following modes:

Static Mode—the necessary information for making the requests to the provisioning system are pre-allocated inside the customer repository. In the event of a fault, the information is extracted from the database, formulated and sent to the provisioning system.

Dynamic Mode—the necessary information for making the requests to the provisioning system are obtained dynamically through interaction between the provisioning system and the control module. In this case, it is not necessary to pre-configure information in the database.

A disaster recovery control module (DRCM) 160 is a software module that deals with automating the disaster recovery process in response to a fault event signaled by the application server control module 154. This module, according to the information contained in the customer repository 152, can activate the following procedures:

Interaction with the customer information manager module 150 for the purpose of collecting information concerning the topology of the network of the production site 52 and the interconnection between the production site 52 and the recovery site 54.

Transmission of a message to the provisioning platform control module 158 so that the routing plan configured at the production site 52 is migrated to the recovery site 54. This phase involves modification to the configurations of the CE devices present at the customer site and at the provider site and of the corresponding PE devices.

Interaction with the storage gateway control module 156 for the purpose of identifying the most recent system image saved on the SAN devices 82 within the recovery site 54.

Configuration of the DHCP (Dynamic Host Configuration Protocol) Server at the recovery site so that at the moment of the diskless boot, the designated recovery server in the server pool at the recovery site 54 receives the same IP address as the application server 62 at the production site 52.

Interaction with the customer information manager module 150 to identify the hardware system belonging to a resource pool at the recovery site 54 that has characteristics compatible with the application server 62.

Enable a diskless boot procedure on the recovery server 72. For example a diskless boot procedure of the type available on the Internet for download via the URL: http://www.cisco.com/en/US/products/hw/ps4159/ps2160/products_installation_and_configuration_guide_book0 9186a00801a45b0.html (at the filing date of the present patent application) can be used.

The modules 150, 154, 156, 158, and 160 are executed by a CPU 172 located in the recovery control server 84. Additionally, these modules interact with interface module 162 for purposes of communication. The interface module 162 includes various adapters including keep-alive module 164, storage gateway adapter 166, provisioning platform adapter 168, and storage platform adapter 170.

When the application server 62 is restored at the production site 52, a fail-back procedure can be activated, either manually or automatically, to return the network configuration to the state prior to the fault and release the allocated resources. The fail-back procedure follows a similar logic to the recovery procedure, with obvious symmetries with respect to the recovery mode.

To initially configure the system, the software mirror 68 is installed on the application server 62 to perform synchronous or asynchronous mirroring or periodic replication. The recovery control server 84 performs a number of configuration activities. For example, the SGCM 156 carries out the configuration for the association between the storage 60 at the production site 52 and the IP address of the application server 62. The PPCM 158 makes requests to the provisioning system for the network configuration to be loaded inside the repository module 152. The information loaded may include the following:

CE-PE network device IDs used to ensure connectivity of the production site 52 to the recovery site 54. The CE-PE network device IDs used to ensure accessibility to the recovery site from all sites involved in the disaster recovery. The routing plan used at the production site to migrate to the recovery site in cases of disaster recovery. Access control lists configured on the CE device at the production site that define the access rules for the service make available by the application server through extranet connectivity.

The CIMM 150 in the recovery control server 84 adds information regarding the application server 62 and the production site to the repository module 152. Such information includes hardware characteristics of the server (e.g., the size of the system image, number of network interfaces, etc.), the software characteristics of the application server, and information originating from the PPCM 158.

Finally, the ASCM 154 activates periodic polling in order to check the availability of the server. If the server does not respond, it will activate the disaster recovery procedure.

Figure 5:
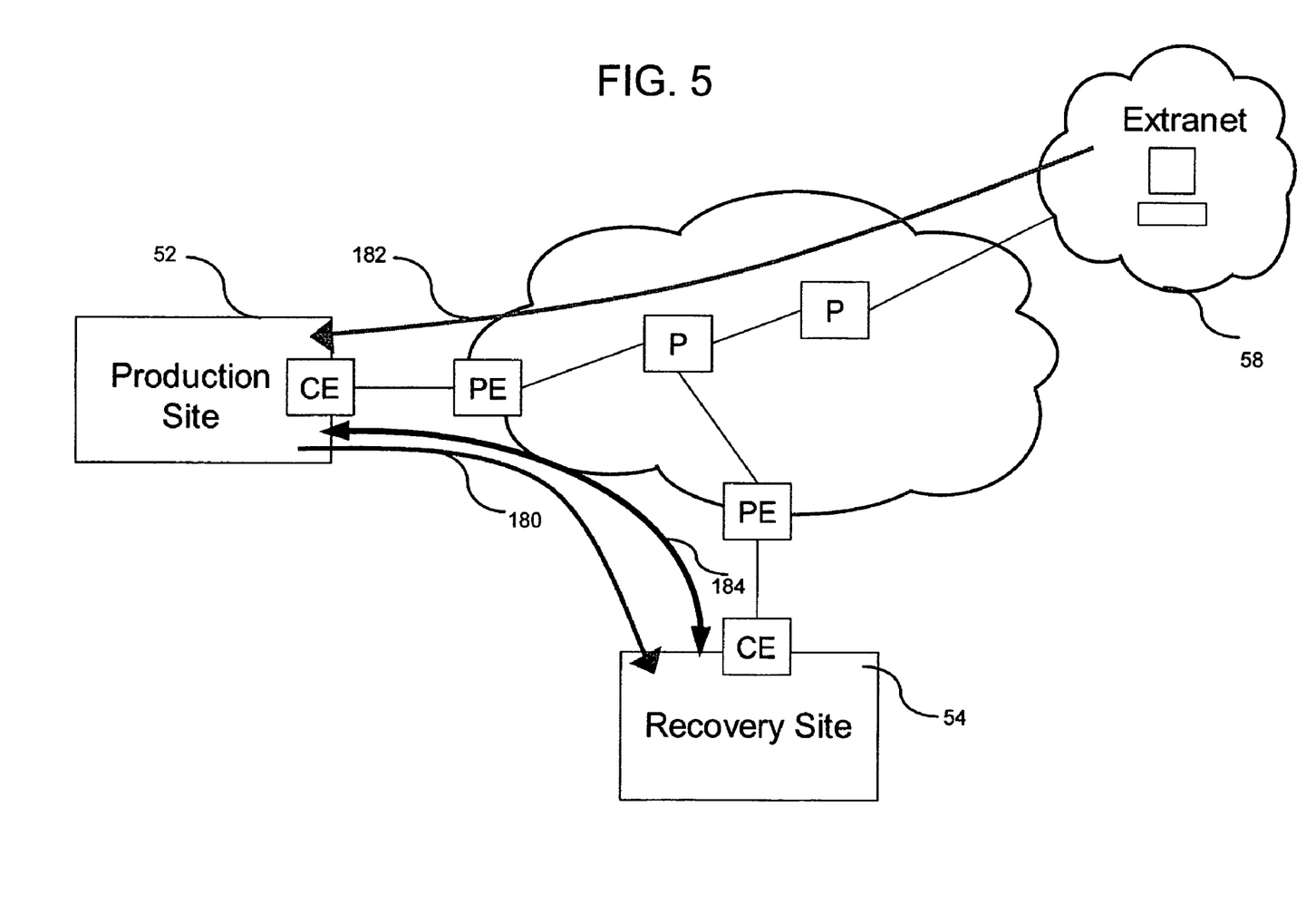
FIG. 5 shows the flow of network traffic during a normal state of operation.

FIG. 5 shows the system in normal operating conditions. The ASCM 154 checks that the Application Server is active as shown by arrow 180. It is also desirable that the system administrator of the application server communicates hardware variations made on the application server platform to the administrator of the disaster recovery service. The objective is to maintain the information held in the repository 152 up to date and allow the correct recovery server to be selected in cases of disaster recovery procedure activation. As shown by arrow 182, during normal operation, the extranet client 58 accesses the application server 62 on the production site 52. As information is being updated on the server 62, the software mirror 68 ensures the information is also stored on the recovery site 54 as shown by arrow 180.

The disaster recovery procedure is activated when the ASCM 154 does not receive an ACK message from the application server 62 for a time interval exceeding the configurable threshold. Using the DRCM 160, the recovery control server 84 is able to activate the following procedure:

1) Interact with the CIMM 150 for the purpose of collecting information concerning the topology of the network of the production site and the interconnection between the production site and the recovery site.

2) Transmit a message (MigrateNetwork) to the PPCM so that the routing plan configured at the production site is migrated to the recovery site. This phase involves modification to the configurations of the CE-PE devices at the customer site and at the provider site.

3) Interaction with the SGCM for the purpose of identifying the most recent system image saved on the storage systems within the recovery site (which may coincide with the most recent in cases where a replication mechanism is used).

4) Configuration of the DHCP Server at the recovery site to enable the recovery server to receive the same IP address as the application server at the production site, when it is booted (diskless boot).

5) Interaction with the CIMM to identify the hardware system belonging to a resource pool at the recovery site that has characteristics compatible with the application server.

6) Enabling of the diskless boot procedure: in this phase, the GUI will notify a human operator that the recovery server selected from the hardware resource pool in standby can be powered up.

The Recovery Server, which might not have internal storage (diskless), makes a request to the DHCP Server to obtain an IP address and the information relative to accessing the storage system that contains the system image of the application server (IP address, Volume Names, LUN, etc.). Once this information is received, the recovery server is able to perform a diskless boot over the network. When booting finishes, the recovery server is aligned with the original application server up to the last transaction. Every Intranet, Extranet or Internet client can access the restored services of the recovery server via TCP/IP using the connectivity set up of the Disaster Recovery procedure.

Figure 6:
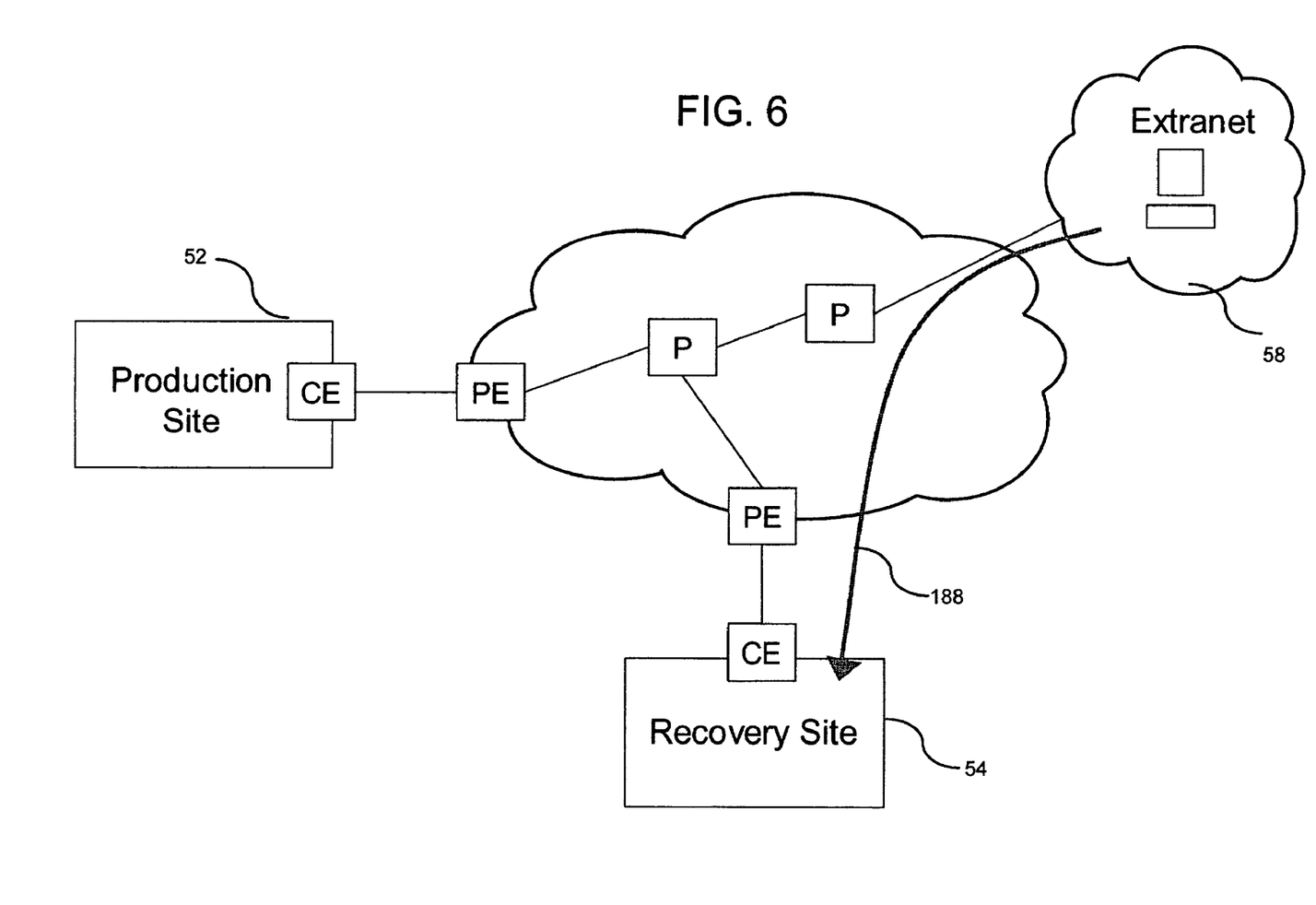
FIG. 6 shows the flow of network traffic in case of a disaster recovery situation.

FIG. 6 shows the data flow after the disaster recovery procedure has been initiated. As shown by arrow 188, when the extranet client attempts to access the production site 52, the request is automatically rerouted to the recovery site 54. This happens transparently to the extranet user and without the extranet user having to type in a different network address for the recovery site. Thus, from the perspective of the extranet client, the production site is still being accessed, even though in actuality the recovery site is being accessed.

Figure 7:
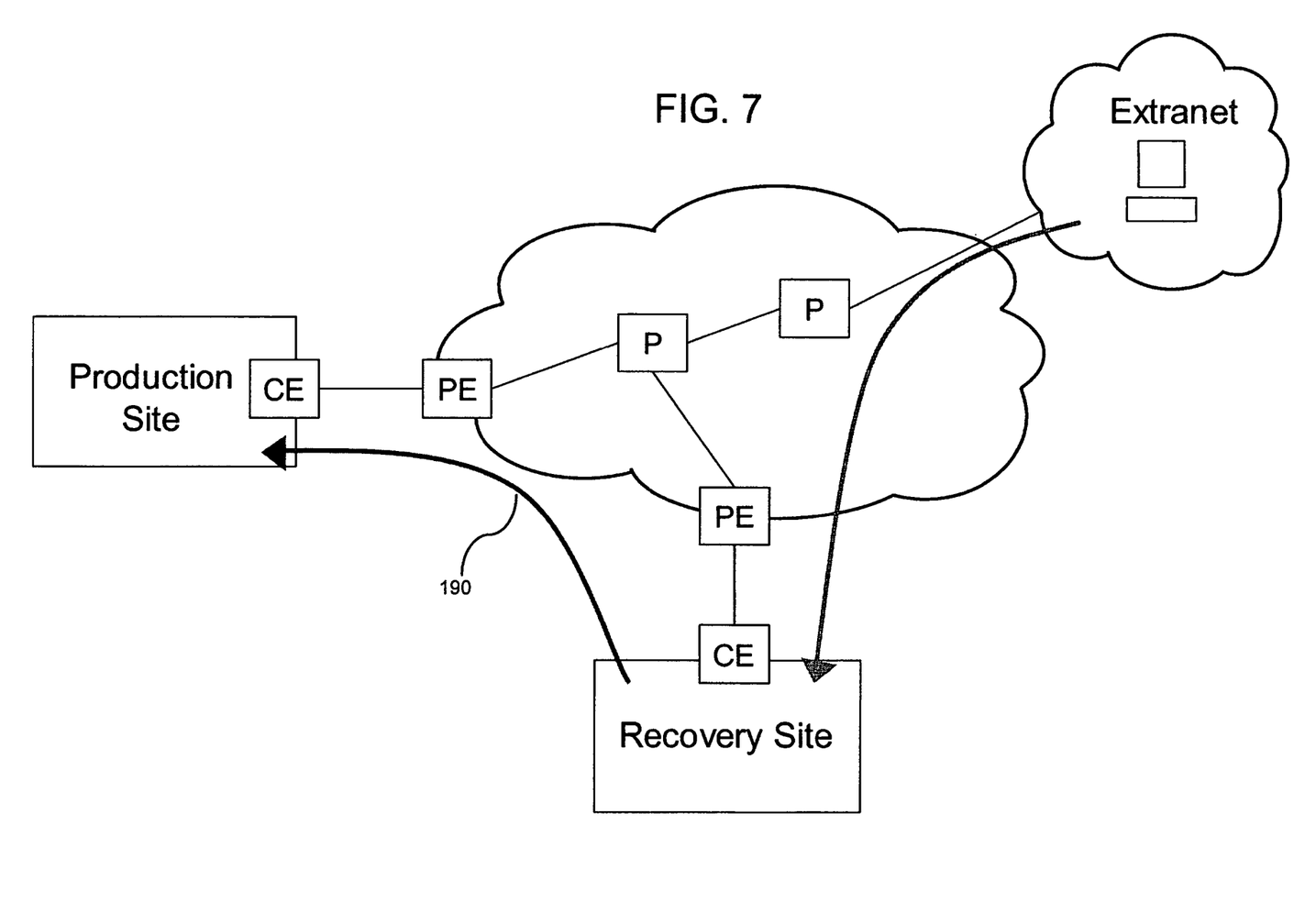
FIG. 7 shows the flow of network traffic in a fail-back situation.

FIG. 7 shows the fail-back condition. The fail back procedure allows a return to the initial state after a disaster recovery procedure. After the application server 62 at the production site 52 has been restored, there is still a period of time when all services are provided by the recovery site.

The fail-back procedure can include the following phases for returning to the previously described normal operating conditions:

1) The SGCM 156 activates the reverse replication procedure for making a consistent copy of the data of the recovery site on the production site as shown by arrow 190.

2) The DRCM transmits a message (MigrateNetwork) to the PPCM so that the routing plan configured at the recovery site is migrated to the production site. This phase involves modification to the configurations of the CE-PE devices at the customer site and at the provider site.

3) The service at the production site is restarted and the clients access the original application server 62.

4) The hardware resources used by the recovery server 78 at the recovery site 54 are released (returned to the free resource pool).

5) The synchronous/asynchronous mirroring (or replication) procedure is reactivated.

Figure 8:
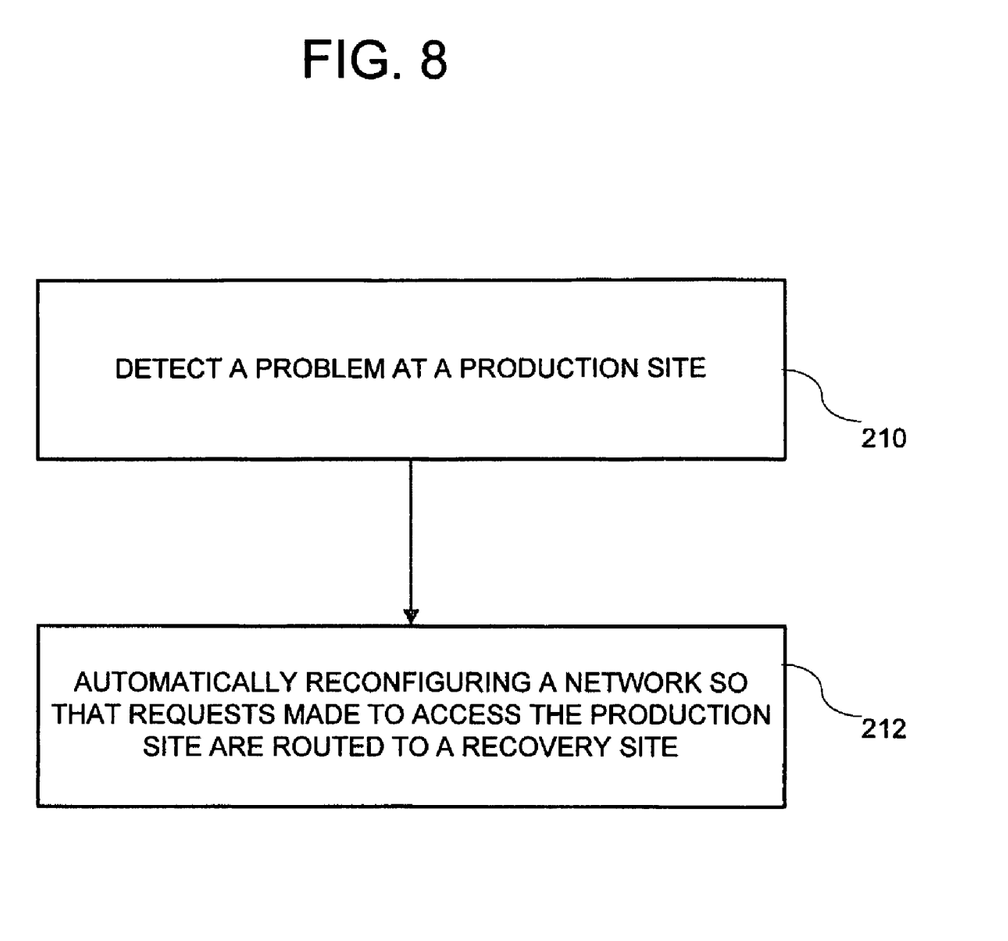
FIG. 8 is a flowchart of a method for implementing the present invention.

FIG. 8 shows a flowchart of a method for implementing the invention. In process block 210, the recovery site detects a problem at the production site through polling. In process block 212, the recovery site automatically performs a reconfiguration of the network so that attempts to access the production site are routed to the recovery site. Such requests may come from extranet or intranet requests.

The advantages of the present invention are evident from the foregoing description.

In particular, an advantage is that the RPO and RTO parameters are optimized through replication performed via the mirroring process.

Another advantage is that the present invention is independent of the software/hardware solutions adopted at the production or recovery sites.

Yet another advantage is automatic rerouting to rout clients to the recovery server.

Finally, it is clear that numerous modifications and variants can be made to the present invention, all falling within the scope of the invention.

For example, the solution can be extended and modified, acting on the individual components that achieve it or integrating pre-existing components in a control architecture in the field.

In particular, in the production site, the components that provide the synchronous/asynchronous mirroring software are not restricted to any particular technology. They can be realized with virtualization mechanisms that are host based, network based, or array based and with software modules or with specific hardware components.

Furthermore, "disaster" as described herein means that the production site is not functioning for whatever reason. It does not mean that an actual disaster had to occur.

Still further, for the interconnection network between the production site and the recovery site, the protocol utilized for the mirroring/replication flow to the remote site can be a standard or proprietary protocol, as long as it performs the function of reproducing on storage at the recovery site the same writes made on that of the production site (e.g., SCSI).

Additionally, on the recovery site, the mechanisms for booting over the network can use different transport protocols, locally at the recovery site with respect to those used for accessing data at the production site or in the interconnection between the two sites (Fiber Channel or iSCSI for example). Further, the recovery control server can be built all together inside the same device or in a distributed manner exploiting the characteristics or functionality of other devices that achieve the required basic functions. The control logic of these functions can be realized on an independent system or integrated as additional functionality in one of the mentioned devices. In particular, the network rerouting of the service provided after restarting the application server on the recovery site can be partially or completely managed by a separate system, integrated with the intelligence module of the system in hand and delegated to the dynamic management of the Extranet/Intranet VPN sites regarding a connectivity provider. This rerouting mechanism can use various alternatives, according to the specific connectivity utilized between the two sites and between the client and the production site (MPLS VPN or stackable VLAN/dot1q, etc.). Similarly, the components of the storage gateway inside the recovery control server can be realized by integrating base modules already present in commercial products, such as gateways or storage switches.

To further optimize restoring the primary site to normal conditions (fail back), the recovery and restore mechanisms of the solution can refer to specific QoS mechanisms, dynamic or otherwise, capable of reducing the restore activity time window, providing the interconnection between the two sites with a wider transmission band than that available in normal operating conditions, to accelerate operations in the recovery and restore phase.

As anticipated, to optimize the processing hardware resources formed by the recovery server(s) at the recovery site, especially on the individual recovery servers, specific software modules could be installed to virtualize the physical resources in order to uncouple the hardware characteristics of the application servers protected by the solution from those of the systems that constitute the resource pool.

This makes it easier to render such recovery servers compatible with the hardware of the production site's primary servers and to ensure a more efficient assignment of resources. In this way, thanks to functions that virtualize the system's physical drivers (1:1 virtualization), which allow different hardware to be emulated on the same physical configuration, the advanced disaster recovery service can be freed from adopting servers with an identical hardware configuration to that of the application server at the production site. In addition, it is also possible to use virtualization software to simultaneously exploit the same hardware resource for more than one application server image (n:1 virtualization).

The invention claimed is:

1. A method of performing disaster recovery in architecture comprising a production site and a recovery site adapted for being coupled together by a packet-based network, comprising:
   storing a plurality of mirrored copies of at least part of the production site, wherein each of the plurality of mirrored copies represents a change occurring on at least part of the production site;
   detecting a problem with the production site;
   in response to the detection of the problem, autonomously setting operating rules relative to an operating domain of the production site and the recovery site, wherein the rules direct the operating domain to interact with an external control system not controlled by said operating domain, and automatically reconfiguring the packet-based network so that attempts to access the production site via the packet-based network are routed to the recovery site,
   wherein a first of the plurality of stored mirrored copies corresponds to a stable operating condition of the production site and a second of the plurality of stored mirrored copies corresponds to the most recent transaction of the production site, and wherein the first and second stored mirrored copies are accessible at the recovery site;
   selecting a recovery server on the recovery site from a pool of recovery servers by retrieving hardware characteristics associated with a production server on the production site and matching those characteristics with the hardware characteristics of the recovery servers in the pool on the recovery site;
   determining, in response to a resolution of the problem, whether the most recent transaction of the production site caused the problem;
   if the most recent transaction of the production site did not cause the problem, copying the second of the plurality of the stored mirrored copies to an application server associated with the production site; and
   if the most recent transaction of the production site caused the problem, copying the first of the plurality of the stored mirrored copies to the application server associated with the production site.

2. The method of claim 1, further comprising polling the production site from the recovery site at predetermined intervals.

3. The method of claim 1, comprising detecting a resolution of the problem at the production site and automatically restoring the production site by copying recovery data from the recovery site to the production site.

4. The method of claim 3, wherein, after restoring the production site, automatically reconfiguring the network to allow access to the production site.

5. The method of claim 1, comprising accessing the recovery server on the recovery site from intranet and extranet computers using the network address of the production server on the production site.

6. The method of claim 1, wherein detecting a problem comprises:
   polling a server on the production site;
   waiting a predetermined period of time for a response from the server; and
   launching a disaster recovery procedure in response to expiration of the predetermined period of time.

7. The method of claim 1, wherein reconfiguring the network comprises rerouting requests having the network address of the production site to the recovery site.

8. The method of claim 1, further comprising storing on the recovery site, both a stable copy of a state of a the production server on the production site and a copy of the production server on the production site up to the last transaction.

9. A system for performing a disaster recovery in a packet-based telecommunication network, comprising a production site and a recovery site adapted for being coupled together by the network comprising:
   a recovery control server located on the recovery site comprising:
      a first module capable of detecting a problem with the production site;
      a second module capable of automatically reconfiguring the network upon detection of the problem so that attempts to access the production site are routed to the recovery site;
      a third module for storing thereon a plurality of mirrored copies of at least part of the production site, each of the plurality of mirrored copies representing a change occurring on at least part of the production site,
      wherein a first of the plurality of stored mirrored copies corresponds to a stable operating condition of the production site and a second of the plurality of stored mirrored copies corresponds to the most recent transaction of the production site, and wherein the first and second stored mirrored copies are accessible at the recovery site;
      a fourth module configured to:
         select a recovery server on the recovery site from a pool of recovery servers by retrieving hardware characteristics associated with a production server on the production site and matching those characteristics with the hardware characteristics of the recovery servers in the pool on the recovery site;
         autonomously set operating rules relative to an operating domain of the production site and the recovery site, wherein the rules direct the operating domain to interact with an external control system not controlled by said operating domain;
         determine, in response to a resolution of the problem, whether the most recent transaction of the production site caused the problem;
         if the most recent transaction of the production site did not cause the problem, copy the second of the plurality of the stored mirrored copies to an application server associated with the production site; and
         if the most recent transaction of the production site caused the problem, copy the first of the plurality of the stored mirrored copies to the application server associated with the production site.

10. The system of claim 9, further comprising an application server located on the production site comprising a mirroring module that performs a synchronous replication of an image of the application server on the production site to the recovery site.

11. The system of claim 10, further comprising a database stored on the recovery site that stores information regarding the application server on the production site.

12. The system of claim 11, wherein the information regarding the application server comprises one or more of the following:
   the application server routing plan;
   hardware characteristics of the application server; and
   image characteristics.

13. A recovery site adapted for being coupled to a production site via a packet-based telecommunication network, comprising:
   a recovery control server comprising:
      a first module capable of detecting a problem with the production site; and
      a second module capable of automatically reconfiguring the network upon detection of the problem so that attempts to access the production site are routed to the recovery site;
      a third module for storing thereon a plurality of mirrored copies of at least part of the production site, each of the plurality of mirrored copies representing a change occurring on at least part of the production site,
      wherein a first of the plurality of stored mirrored copies corresponds to a stable operating condition of the production site and a second of the plurality of stored mirrored copies corresponds to the most recent transaction of the production site, and wherein the first and second stored mirrored copies are accessible at the recovery site;
   a fourth module configured to:
      select a recovery server on the recovery site from a pool of recovery servers by retrieving hardware characteristics associated with a production server on the production site and matching those characteristics with the hardware characteristics of the recovery servers in the pool on the recovery site;
      autonomously set operating rules relative to an operating domain of the production site and the recovery site, wherein the rules direct the domain to interact with an external control system not controlled by said operating domain;
      determine, in response to a resolution of the problem, whether the most recent transaction of the production site caused the problem;
      if the most recent transaction of the production site did not cause the problem, copy the second of the plurality of the stored mirrored copies to an application server associated with the production site; and
      if the most recent transaction of the production site caused the problem, copy the first of the plurality of the stored mirrored copies to the application server associated with the production site.

* * * * *